US012769151B2

(12) United States Patent
Matsuoka

(10) Patent No.: US 12,769,151 B2
(45) Date of Patent: Oct. 20, 2026

(54) EYEGLASS LENS AND EYEGLASS LENS MANUFACTURING METHOD

(71) Applicant: HOYA LENS THAILAND LTD., Pathumthani (TH)

(72) Inventor: Shohei Matsuoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 355 days.

(21) Appl. No.: 18/567,725

(22) PCT Filed: Mar. 24, 2022

(86) PCT No.: PCT/JP2022/013873
§ 371 (c)(1),
(2) Date: Dec. 6, 2023

(87) PCT Pub. No.: WO2022/259700
PCT Pub. Date: Dec. 15, 2022

(65) Prior Publication Data

US 2024/0280837 A1 Aug. 22, 2024

(30) Foreign Application Priority Data

Jun. 7, 2021 (JP) ................................ 2021-094961

(51) Int. Cl.
*G02C 7/06* (2006.01)
*G02C 7/14* (2006.01)

(52) U.S. Cl.
CPC .............. *G02C 7/065* (2013.01); *G02C 7/14* (2013.01)

(58) Field of Classification Search
CPC .......... G02C 7/065; G02C 7/14; G02C 7/061; G02C 2202/22; G02C 2202/18;
(Continued)

(56) References Cited

U.S. PATENT DOCUMENTS 6,186,627 B1 2/2001 Obara
2006/0139571 A1 6/2006 Poulain et al.
(Continued)

FOREIGN PATENT DOCUMENTS

JP 2000227579 A 8/2000
JP 2006513460 A 4/2006
(Continued)

OTHER PUBLICATIONS

May 9, 2025 Search Report issued in European Patent Application No. 22819890.9.
(Continued)

*Primary Examiner* — Thomas K Pham
*Assistant Examiner* — Justin W. Hustoft
(74) *Attorney, Agent, or Firm* — Oliff PLC

(57) ABSTRACT

A spectacle lens to which a base in prism deflecting light toward a nose of a user is added, wherein the spectacle lens has a reverse prism slope that has a sign opposite to a sign of an addition prism slope on a progressive zone at least in a distance side region of the addition prism curve expressed as a function of vertical coordinates on the spectacle lens, and an absolute value of the reverse prism slope is larger than 0.014 times the absolute value of the addition prism slope on the progressive zone.

11 Claims, 7 Drawing Sheets

Without base in prism

With base in prism

(58) Field of Classification Search
CPC .......... G02C 5/003; G02C 7/028; G02C 7/02; G02C 7/024; G02C 7/063; G02C 7/022; G02C 7/04; G02C 7/045; G02C 7/044; G02C 2202/06; G02C 2202/12; G02C 7/049; G02C 7/041; G02B 25/001; G02B 25/007; G02B 25/008; G02B 3/10
USPC ... 351/159.41, 159.45, FOR. 112, FOR. 117, 351/178, 159.42, 159.01, 159.06, 159.17, 351/159.73, 159.76, 41; D16/300, 900
See application file for complete search history.

(56) References Cited

U.S. PATENT DOCUMENTS

2006/0170863 A1 8/2006 Krall
2016/0209677 A1 7/2016 Izawa et al.
2017/0351116 A1* 12/2017 Kaga ...................... G02C 7/063
2018/0004010 A1 1/2018 Kaga et al.
2019/0302480 A1 10/2019 Hatanaka et al.
2021/0341758 A1 11/2021 Asami et al.

FOREIGN PATENT DOCUMENTS

JP 5156396 B2 3/2013
JP 2016126147 A 7/2016
JP 2018097283 A 6/2018
WO 2015041327 A1 3/2015
WO 2020067523 A1 4/2020

OTHER PUBLICATIONS

PCT/JP2022/013873, "International Preliminary Report on Patentability", Dec. 21, 2023, 6 pages.
PCT/JP2022/013873, English Translation of "International Search Report", May 17, 2022, 3 pages.

* cited by examiner

Without base in prism

With base in prism

EYEGLASS LENS AND EYEGLASS LENS MANUFACTURING METHOD

CROSS-REFERENCE TO RELATED APPLICATIONS

This application is the National Stage of International Application No. PCT/JP2022/013873, filed Mar. 24, 2022, which claims priority to Japanese Patent Application No. 2021-094961, filed on Jul. 7, 2021, and the contents of which is incorporated by reference.

TECHNICAL FIELD

The present disclosure relates to a spectacle lens and a manufacturing method of the spectacle lens.

BACKGROUND ART

It is known that adding a base in prism deflecting light toward a nose of a user, in an amount that corresponds to a viewing distance converted into diopters supports the age-related decline in convergence power and reduces fatigue level. It is also known that astigmatism occurs due to distortion of a lens surface upon addition of the base in prism depending on the viewing distance. For example, Patent Literature 1 proposes that the addition prism curve is replaced with a smooth monotonically increasing curve to reduce aberrations.

CITATION LIST

Patent Literature

[Patent Literature 1] Japanese Patent Laid Open Publication No. 2018-97283

SUMMARY OF DISCLOSURE

Problems to be Solved by Disclosure

An embodiment of the present disclosure is to provide a technique capable of reducing third-order aberration in a spectacle lens to which a base in prism deflecting light toward a nose of a user is added depending on a viewing distance.

Solution to Problem

A first aspect of the present disclosure provides a spectacle lens to which a base in prism deflecting light toward a nose of a user is added, wherein the spectacle lens has a reverse prism slope that has a sign opposite to a sign of an addition prism slope on a progressive zone at least in a distance side region of the addition prism curve expressed as a function of vertical coordinates on a spectacle lens, and an absolute value of the reverse prism slope is larger than 0.014 times the absolute value of the addition prism slope on the progressive zone.

A second aspect of the present disclosure provides the spectacle lens according to the first aspect, wherein both on a principal meridian of the spectacle lens and on an umbilical point that has been shifted toward the nose of the user by the base in prism, the absolute value of the reverse prism slope is larger than 0.014 times the absolute value of the addition prism slope on the progressive zone.

A third aspect of the present disclosure provides the spectacle lens according to the first or second aspect, wherein the absolute value of the reverse prism slope is less than 0.00625 Δ/mm.

A fourth aspect of the present disclosure provides the spectacle lens according to the third aspect, wherein both on a principal meridian of the spectacle lens and on an umbilical point that has been shifted toward the nose of the user by the base in prism, the absolute value of the reverse prism slope is less than 0.00625 Δ/mm.

A fifth aspect of the present disclosure provides the spectacle lens according to any one of the first to fourth aspects, wherein an amount of the base in prism that is added changes depending on a viewing distance.

A sixth aspect of the present disclosure provides the spectacle lens according to any one of the first to fifth aspects, wherein a difference between a maximum value and a minimum value of the amount of the base in prism that is added is 0.254 or more.

A seventh aspect of the present disclosure provides a manufacturing method of a spectacle lens to which a base in prism deflecting light toward a nose of a user is added, including:

a prism design step to design so that the spectacle lens has a reverse prism slope that has a sign opposite to a sign of an addition prism slope on a progressive zone at least in a distance side region of the addition prism curve expressed as a function of vertical coordinates on the spectacle lens, wherein in the prism design step, an absolute value of the reverse prism slope is designed to be larger than 0.014 times the absolute value of the addition prism slope on the progressive zone.

Advantageous Effects of Disclosure

According to an embodiment of the present disclosure, third-order aberration can be reduced in a spectacle lens to which a base in prism deflecting light toward a nose of a user is added depending on the viewing distance.

BRIEF DESCRIPTION OF DRAWINGS

FIG. 1(*b*) illustrates an example of a power distribution map with a base in prism and an aberration distribution map with a base in prism.

DESCRIPTION OF EMBODIMENTS

<Knowledges Obtained by the Inventor>

First, the knowledges obtained by the inventor will be described.

In the present specification, in the vertical direction of the spectacle lens, the upper side is expressed as positive and the lower side is expressed as negative, and in the horizontal direction of the spectacle lens, the ear side of a user is expressed as positive and the nose side is expressed as negative. The origin position is, for example, the center of the lens (at least any one of geometrical center, optical center, and centering center).

The method described in Patent Literature 1 and the like optimizes only astigmatism on the principal meridian caused by distortion of the lens surface. After the base in prism is added, however, it has less significance because the line of sight does not pass on the original principal meridian anyway. Note that, in the present specification, the principal meridian refers to a line formed of areas on the spectacle lens through which the lines of sight pass when the user wearing the spectacle lens moves the line of sight from above to below. This principal meridian forms the basis for designing the spectacle lens.

Figure 1A:
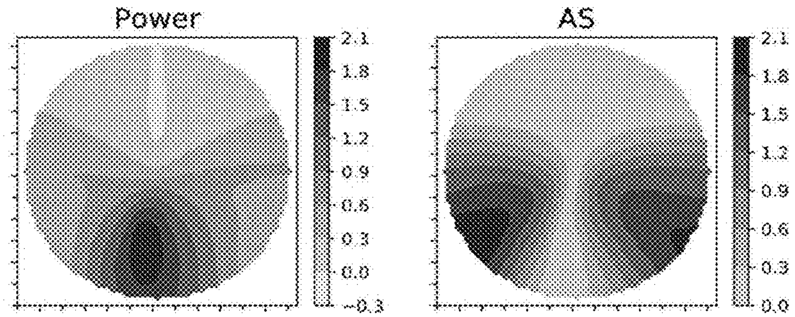
FIGS. 1(*a*)-1(*b*) FIG. 1(*a*) illustrates an example of a power distribution map without a base in prism and an aberration distribution map without a base in prism.
Figure 1B:
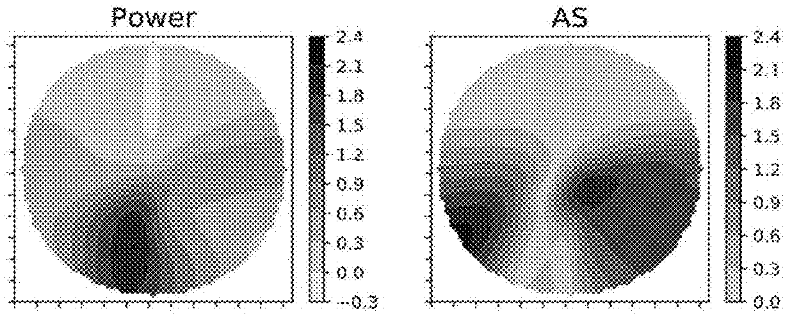

FIG. 1(*a*) illustrates an example of a power (Power) distribution map without a base in prism and an astigmatism (AS) distribution map without a base in prism; and FIG. 1(*b*) illustrates an example of a power distribution map with a base in prism and an astigmatism distribution map with a base in prism. In FIG. 1(*a*) and FIG. 1(*b*), the nose side is on the left-hand side. FIG. 1(*a*) and FIG. 1(*b*) illustrate that the base in prism makes the power bilaterally asymmetric, with lower power in the distance side region on the nose side and higher power in the near side region on the nose side. They also illustrate that the umbilical point (the region with relatively less error in astigmatism with respect to the prescription in the intermediate region and near side region of the progressive power lens) has been shifted toward the nose.

The investigation by the present inventor revealed that as the umbilical point is shifted toward the nose by the base in prism, the position through which the line of sight passes is also shifted toward the nose. More specifically, it is found that the line of sight tends to pass on a midpoint between the original principal meridian and the umbilical point that has been shifted. Based on this, the present inventor has discovered a novel problem in a spectacle lens to which a base in prism is added. In other words, there is a problem that when the position through which the line of sight passes is shifted closer to the nose, the power becomes more insufficient in the distance side region (excessive power in the near side region). There is also a problem that as the power changes in the position through which the line of sight passes, the amount of the added base in prism becomes excessive in the distance side region (insufficient in the near side region).

Figure 2A:
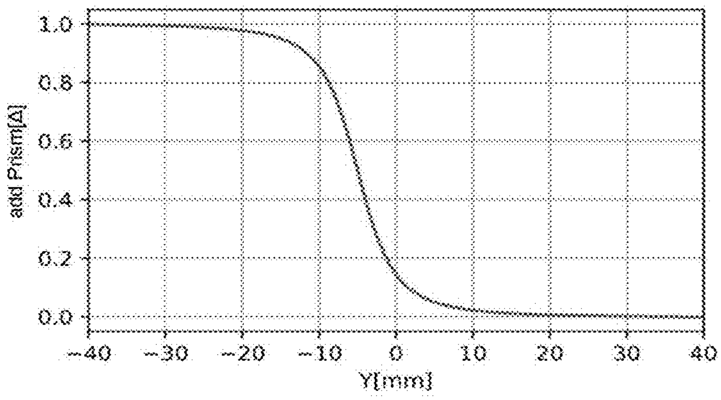
FIGS. 2(*a*)-2(*b*) FIG. 2(*a*) is a graph illustrating an example of an addition prism curve expressed as a function of vertical coordinates on a spectacle lens, and FIG. 2(*b*) is a graph illustrating an example of a change in an amount of sag Z around a principal meridian.
Figure 2B:
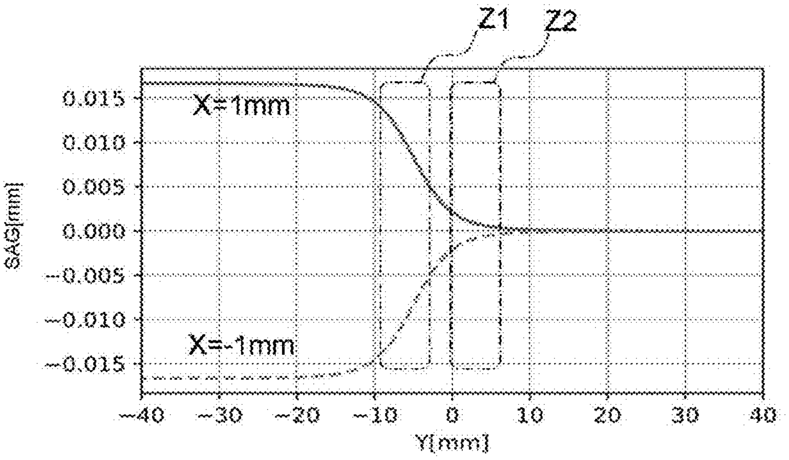

FIG. 2(*a*) is a graph illustrating an example of an addition prism curve expressed as a function of vertical coordinates on the spectacle lens, and FIG. 2(*b*) is a graph illustrating an example of a change in an amount of sag Z around a principal meridian. FIG. 2(*a*) illustrates a case where the addition prism curve is a monotonically increasing curve (which monotonically increases downward, the same applies hereinafter). In FIG. 2(*b*), the solid line indicates an amount of sag Z at a position shifted 1 mm from the principal meridian toward the ear (X=1 mm), the dashed line indicates an amount of sag Z at a position shifted 1 mm from the principal meridian toward the nose (X=−1 mm). In FIG. 2(*a*) and FIG. 2(*b*), the abscissa axis (Y) represents vertical coordinates on the spectacle lens.

In FIG. 2(*b*), in region Z1, a slope (dZ/dY) of the amount of sag Z changes with the horizontal coordinate (X), so that oblique astigmatism occurs, which adds aberration on the principal meridian and shifts the umbilical point toward the nose. On the other hand, in region Z2, a curvature ($d^2Z/dY^2$) of the amount of sag Z changes with the horizontal coordinate (X), so that third-order aberration occurs. In addition, the power differs between the ear side and the nose side. Particularly, the power is smaller in the distance side region on the nose side.

The present inventor has studied intensively, particularly focusing on the third-order aberration described above. As a result, it is found that the above-described problem can be solved by designing so that the spectacle lens has a reverse prism slope that has a sign opposite to a sign of an addition prism slope on a progressive zone at least in a distance side region of the addition prism curve expressed as a function of vertical coordinates on the spectacle lens.

Figure 3A:
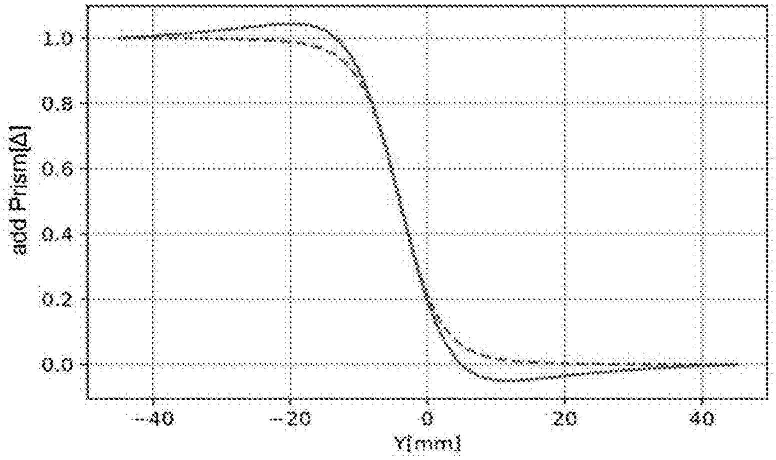
FIGS. 3(*a*)-3(*c*) FIG. 3(*a*) is a graph illustrating an example of an addition prism curve, FIG. 3(*b*) is a graph illustrating an example of a slope of the addition prism curve (a first-order differentiation of the addition prism curve), and FIG. 3(*c*) is a graph illustrating an example of a curvature of the addition prism curve (a second-order differentiation of the addition prism curve).
Figure 3B:
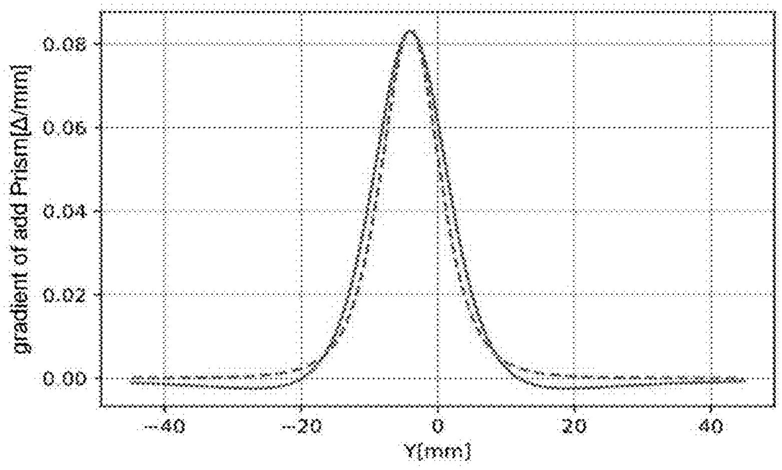
Figure 3C:
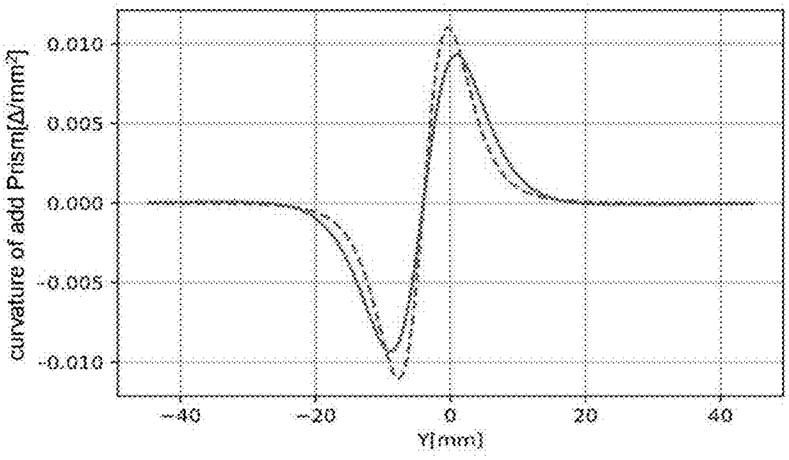

FIG. 3(*a*) is a graph illustrating an example of an addition prism curve, FIG. 3(*b*) is a graph illustrating an example of a slope of the addition prism curve (a first-order differentiation of the addition prism curve), and FIG. 3(*c*) is a graph illustrating an example of a curvature of the addition prism curve (a second-order differentiation of the addition prism curve). In FIG. 3(*a*) to FIG. 3(*c*), the dashed line indicates a case where the addition prism curve is a monotonically increasing curve, and the solid line indicates a case where the addition prism curve has a reverse prism slope. In FIG. 3(*a*) to FIG. 3(*c*), the abscissa axis (Y) represents vertical coordinates on the spectacle lens.

As can be seen from FIG. 3(*c*), the absolute value of the curvature in a case where the addition prism curve has the reverse prism slope is smaller than that in a case where the addition prism curve is the monotonically increasing curve. Thus, third-order aberrations caused by changes in curvature can be reduced. Reducing the third-order aberrations can reduce the power variation that occurs associated with shifts of the position through which the line of sight passes. In a case where the addition prism curve has the reverse prism slope, a negative prism is added in the distance side region, thereby eliminating the problem of an excessive amount of the base in prism in the distance side region.

Embodiment of the Present Disclosure

Next, an embodiment of the present disclosure will be described hereafter, with reference to the drawings. The present disclosure is not limited to these examples, but is indicated by the claims, which are intended to include all changes within the meaning and scope equivalent to the claims.

In the present specification, the "horizontal direction" is the 0° or 180° direction in defining the astigmatic axis and the prism base direction, and an example, when the horizontal direction that matches with the direction of the horizontal reference line connecting two alignment reference marks (so-called engraving marks) for fitting the lens into the frame, will be described. The horizontal reference line in this embodiment refers to a line that extends horizontally at a midpoint between the upper vertex and the lower vertex of the spectacle lens (lens before being fitted into the frame). In this embodiment, an example of disposing the engraving marks, so that the principal meridian passes through the center of the horizontal reference line connecting the two engraving marks, will be described.

In this embodiment, the principal meridian in the progressive power lens may be defined as a line connecting the distance power measurement point and the near power measurement point.

First Embodiment of the Present Disclosure

(1) Configuration of Spectacle Lens

First, the configuration of the spectacle lens of this embodiment will be described. The spectacle lens of this embodiment includes a portion (progressive zone) in which a refractive power changes continuously, for example, in a part or all of the progressive power lens. The spectacle lens has an optical surface formed on the object side based on a predetermined design. Examples of the spectacle lens may include not only a so-called finished lens that has a predetermined optical surface on the surface on the eyeball side as well, but also a semi-finished lens whose surface on the eyeball side can be further polished according to the prescription to obtain a finished lens. The progressive power lenses generally encompass lenses called bifocal lenses, occupational lenses, near vision lenses, and accommodation support lenses, as well. A base in prism, which will be described later, may be added to either the object side or the eyeball side. There is no particular restriction on whether it is added to the progressive surface side or not.

The base in prism deflecting light toward the nose of the user is added to the spectacle lens of this embodiment depending on the viewing distance. In other words, in the spectacle lens of this embodiment, the amount of the base in prism that is added changes depending on the viewing distance. For example, the amount of the base in prism in the near side region is larger than the amount of the base in prism in the distance side region. The base in prism is useful, for example, when a user with poor convergence power looks at a nearby object. In the spectacle lens of this embodiment, for example, the difference between the maximum value and the minimum value of the amount of the base in prism that is added is preferably 0.25 Δ(prism diopter) or more, and more preferably 1 Δ or more. In this case, the above-described power variation that occurs associated with shifts of the position through which the line of sight passes is more likely to affect visibility of the spectacle lens. Accordingly, the effect of the present disclosure is more remarkable. Note that the upper limit of the difference between the maximum value and the minimum value of the amount of the base in prism that is added is not particularly limited, but is 6 Δ or less (or 2 Δ or less), for example.

The spectacle lens of this embodiment has a reverse prism slope that has a sign opposite to a sign of an addition prism slope on a progressive zone at least in a distance side region of the addition prism curve expressed as a function of vertical coordinates on the spectacle lens. In this specification, the distance side region of the addition prism curve means the region above the position (or progressive zone) where the slope of the addition prism curve is maximum, and the near side region means the region below the position (or progressive zone) where the slope of the addition prism curve is maximum. The addition prism slope on the progressive zone may also be the maximum value of the slope of the addition prism curve.

However, simply giving a reverse prism slope to the distance side region of the addition prism curve may not reduce the absolute value of the curvature of the addition prism curve compared to the case where the addition prism curve is a monotonically increasing curve. In order to reduce the absolute value of the curvature of the addition prism curve and reduce third-order aberrations, the amount of reverse prism slope given has to be properly controlled. Specifically, the spectacle lens of this embodiment preferably satisfies the following conditions A, B, and C.

(Condition A)

The addition prism curve, as illustrated in FIG. 3(*a*), can be expressed by the following sigmoid function (equation (1)). The following is an explanation of the minimum amount of reverse prism slope required to reduce the third-order aberration, taking as an example a case where the addition prism curve is expressed by a sigmoid function.

[Math. 1]

$$f(x) = \frac{x}{1+q}\left(\frac{1}{\sqrt{x^2+1}} + \frac{q}{\sqrt{x^2+1}^3}\right) \quad (1)$$

Figure 4A:
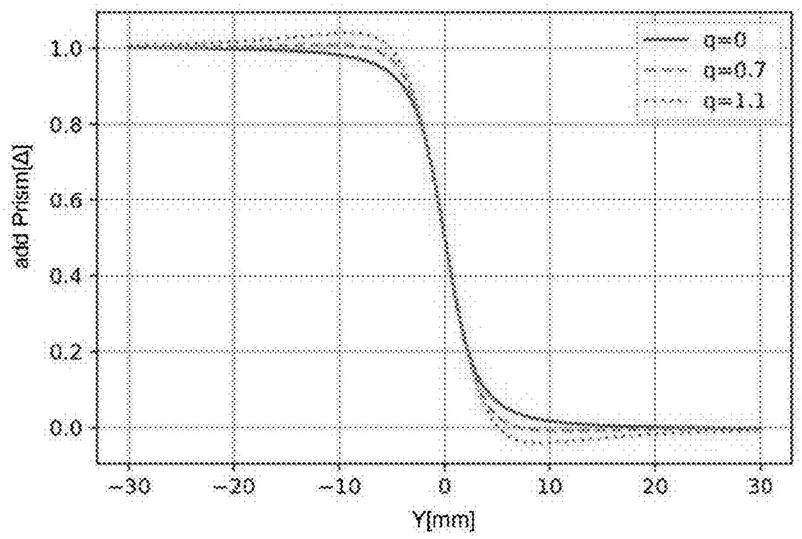
FIGS. 4(*a*)-4(*b*) FIG. 4(*a*) is a graph illustrating an example of an addition prism curve with changing the value of q in equation (1), and FIG. 4(*b*) is a graph illustrating a relation between the values of q and the minimum value/maximum value of the slope of the addition prism curve and a relation between the values of q and the maximum curvature of the addition prism curve.
Figure 4B:
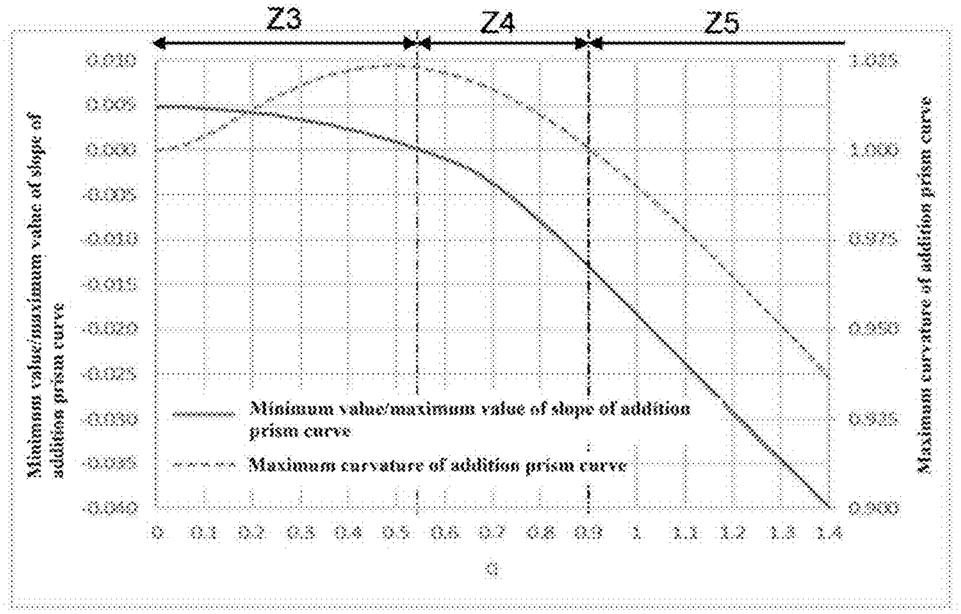

FIG. 4(*a*) is a graph illustrating an example of an addition prism curve with changing the value of q in equation (1). As illustrated in FIG. 4(*a*), when q=0, the addition prism curve is a monotonically increasing curve, but when q=0.7 and q=1.1, a reverse prism slope is given to the addition prism curve. FIG. 4(*b*) is a graph illustrating a relation between the values of q and the minimum value/maximum value of the slope of the addition prism curve and a relation between the values of q and the maximum curvature of the addition prism curve. In FIG. 4(*b*), the solid line indicates the minimum value/maximum value of the slope of the addition prism curve, and the dashed line indicates the maximum curvature of the addition prism curve (relative value taken as 1 when q=0).

The fact that the minimum value/maximum value of the slope of the addition prism curve is positive means that the minimum and maximum values of the slope of the addition prism curve have the same sign. In other words, the region Z3 illustrated in FIG. 4(*b*) is a region where the addition prism curve does not have a reverse prism slope. On the other hand, regions Z4 and Z5 in which the minimum value/maximum value of the slope of the addition prism curve is negative are regions where the addition prism curve has a reverse prism slope. When the addition prism curve has the reverse prism slope, the minimum value of the slope of the addition prism curve can be considered as the reverse prism slope, so the minimum value/maximum value of the slope of the addition prism curve can also be expressed as the reverse prism slope/the addition prism slope on the progressive zone.

As illustrated in FIG. 4(*b*), in region Z4, the maximum curvature of the addition prism curve is larger than that in a case where q=0. That is, region Z4 is a region where the addition prism curve has a reverse prism slope, but the absolute value of the curvature of the addition prism curve is not reduced compared to a case where the addition prism curve is a monotonically increasing curve. For example, the addition prism curve where q=0.7 illustrated in FIG. 4(*a*) has a larger absolute value of curvature than that of the addition prism curve where q=0 (monotonically increasing curve).

On the other hand, in region Z5, the maximum curvature of the addition prism curve is smaller than that in a case where q=0. That is, in a case where q>0.9 (region Z5), the absolute value of the curvature of the addition prism curve is smaller than that in a case where the addition prism curve is a monotonically increasing curve. For example, the addition prism curve where q=1.1 illustrated in FIG. 4(*a*) has a smaller absolute value of curvature than that of the addition prism curve where q=0 (monotonically increasing curve).

In region Z5, there is a one-to-one correspondence between the value of q and the minimum value/maximum value of the slope of the addition prism curve, so q>0.9 can be expressed as the minimum value/maximum value of the slope of the addition prism curve being less than −0.014. The minimum value/maximum value of the slope of the addition prism curve can also be expressed as the reverse prism slope/addition prism slope on the progressive zone. Accordingly, in region Z5, the absolute value of the reverse prism slope is larger than 0.014 times the absolute value of the addition prism slope on the progressive zone. Therefore, when the absolute value of the reverse prism slope is larger than 0.014 times the absolute value of the addition prism slope on the progressive zone, the absolute value of the curvature of the addition prism curve is smaller than that in a case where the addition prism curve is a monotonically increasing curve, which can be said to reduce third-order aberrations.

(Condition B)

As for Condition A, it has been explained that third-order aberrations can be reduced when the absolute value of the reverse prism slope is larger than 0.014 times the absolute value of the addition prism slope on the progressive zone. On the other hand, when the absolute value of the reverse prism slope is too large, oblique astigmatism may occur, which may adversely affect the visibility of the spectacle lens. The following is a description of a preferred range of the reverse prism slope to ensure that oblique astigmatism due to the reverse prism slope does not adversely affect the visibility of the spectacle lens.

Generally, astigmatism is prescribed in units of 0.25 D. Accordingly, when the astigmatism is less than half the amount, 0.125 D, the effect on the visibility of the spectacle lens is considered to be almost negligible. Based on the relation: amount of astigmatism generated due to reverse prism slope (D)=2×10×reverse prism slope (Δ/mm), it can be said that when the absolute value of the reverse prism slope is less than 0.00625 Δ/mm, the amount of the astigmatism generated due to the reverse prism slope can be reduced to less than 0.125 D. Therefore, it is preferable that the absolute value of the reverse prism slope is less than 0.00625 Δ/mm in order to prevent oblique astigmatism due to the reverse prism slope from adversely affecting the visibility of the spectacle lens.

(Condition C)

Conditions for the reverse prism slope explained for Condition A and Condition B are preferably satisfied both on the principal meridian and "on a line which passes through a farthest umbilical point from the principal meridian among umbilical points that have been shifted toward the nose of the user by the base in prism and is parallel to the principal meridian." To avoid complexity, "on a line which passes through a farthest umbilical point from the principal meridian among umbilical points that have been shifted toward the nose of the user by the base in prism, and is parallel to the principal meridian" is herein referred to as "on an umbilical point that has been shifted toward the nose of the user by the base in prism" or "on the shifted umbilical point". In other words, both on a principal meridian of the spectacle lens and on an umbilical point that has been shifted toward the nose of the user by the base in prism, the absolute value of the reverse prism slope is preferably larger than 0.014 times the absolute value of the addition prism slope on the progressive zone. Further, both on a principal meridian of the spectacle lens and on an umbilical point that has been shifted toward the nose of the user by the base in prism, the absolute value of the reverse prism slope is preferably less than 0.00625 Δ/mm. Note that the umbilical point in this embodiment is a region surrounded by contour lines with the smallest astigmatism in the astigmatism distribution map. However, this does not apply to regions where astigmatism is locally reduced due to machining errors or the like.

As described above, when the umbilical point is shifted toward the nose, the line of sight tends to pass on a midpoint between the original principal meridian and the shifted umbilical point. Therefore, Condition A (or Condition B) being satisfied both on the principal meridian of the spectacle lens and on the umbilical point shifted toward the nose of the user by the base in prism means that the effect of Condition A (or Condition B) being satisfied is maintained even when the position through which the line of sight passes is shifted toward the nose of the user.

Next, the amount of umbilical point shift will be explained, which indicates how much the umbilical point is shifted from the original principal meridian when it is shifted toward the nose by the base in prism. The amount of umbilical point shift is expressed as amount of astigmatism generated by base in prism (D)/astigmatism slope in horizontal direction of spectacle lens (D/mm). In addition, the amount of umbilical point shift can be calculated using a relation equation: amount of umbilical point shift (mm)=10× addition prism slope on progressive zone (Δ/mm)/addition power slope (D/mm), derived from relation equations: amount of astigmatism generated by base in prism (D)=2× 10×addition prism slope on progressive zone (Δ/mm) and astigmatism slope in horizontal direction of spectacle lens (D/mm)=2× addition power slope (D/mm). "On the umbilical point shifted toward the nose of the user by the base in prism" can be specified by translating the principal meridian toward the nose by (the maximum value of) the amount of umbilical point shift.

Note that the spectacle lens may or may not have a reverse prism slope in the near side region of the addition prism curve. With a reverse prism slope in the near side region, it is preferable that Condition A, Condition B, and Condition C described above be satisfied for the reverse prism slope in the near side region as well. Further, as indicated by the solid line in FIG. 3(*a*), the reverse prism slopes of the distance side region and the near side region may be symmetric.

(2) Manufacturing Method of Spectacle Lens

A manufacturing method of the spectacle lens of this embodiment will be described below. Hereinafter, for the content not described in the present specification, a known technology may be employed.

(Preparation Step)

In the preparation step, preparation is performed for the subsequent design step. A first preparation is acquiring information required for designing the spectacle lens. The information related to the spectacle lens is roughly divided into: item-specific information which is data unique to a lens item; and user-specific information which is data unique to a user. The item-specific information includes information on a refractive index n of the lens material, and progressive surface designing parameters represented by the progressive zone length. The user-specific information includes information on the distance power (e.g., spherical power S, cylinder power C, astigmatic axis AX, prism power P, prism base direction PAX), addition power ADD, layout data (e.g., distance PD, near PD, eye point position), frame shape, and parameters on the positional relation between the frame and eyes (forward tilting angle, camber angle, distance between vertexes).

(Design Step)

In the design step, spectacle lens is designed based on the information acquired in the preparation step. The design step includes a prism design step of designing a shape of the base in prism. In the prism design step, the shape of a base in prism is designed so that the spectacle lens has a reverse prism slope that has a sign opposite to a sign of an addition prism slope on the progressive zone at least in a distance side region of the addition prism curve expressed as a function of vertical coordinates on the spectacle lens.

In the prism design step, the shape of the base in prism is preferably designed to satisfy Condition A, Condition B, and Condition C described above. That is, in the prism design step, the absolute value of the reverse prism slope is preferably designed to be larger than 0.014 times the absolute value of the addition prism slope on the progressive zone. In addition, both on a principal meridian of the spectacle lens and on an umbilical point that has been shifted toward the nose of the user by the base in prism, the absolute value of the reverse prism slope is preferably designed to be larger than 0.014 times the absolute value of the addition prism slope on the progressive zone. Further, the absolute value of the reverse prism slope is preferably designed to be less than 0.00625 Δ/mm. Furthermore, both on the principal meridian of the spectacle lens and on the umbilical point that has been shifted toward the nose of the user by the base in prism, the absolute value of the reverse prism slope is preferably designed to be less than 0.00625 Δ/mm. By designing the shape of the base in prism in this way, the various effects described in (1) Configuration of spectacle lens can be obtained. Note that the present disclosure can be effective not only as a manufacturing method of a spectacle lens but also as a design method of a spectacle lens.

(Manufacturing Step)

In the manufacturing step, the spectacle lens is manufactured based on the result of the design step. For a specific manufacturing method, a known method may be adopted. For example, the design data acquired in the design step is input to a processor, whereby a lens blank is processed into a spectacle lens.

Steps other than those described above (e.g., cleaning step, coating step, etc.) may of course be added, as necessary.

The spectacle lens with reduced third-order aberration can be manufactured by the above-described steps.

Other Embodiments of the Present Disclosure

Although embodiments of the present disclosure have been specifically described, the present disclosure is not limited to the embodiments described above, and various modifications can be made without departing from the scope of the present disclosure.

For example, an amount of inset or a fitting point in the progressive power lens may be adjusted in consideration of the amount of umbilical point shift described above.

EXAMPLES

Next, Examples of the present disclosure will be described. These Examples are just illustrations of the present disclosure without limitation.

(1) Production of Spectacle Lens

First, Samples 1 to 4 as spectacle lenses were prepared as follows.

Sample 1 was a progressive power lens to which no base in prism was added. The addition power slope on the progressive zone was −0.141 D/mm. The addition power slope on the progressive zone was the same for Samples 2 to 4.

Figure 5A:
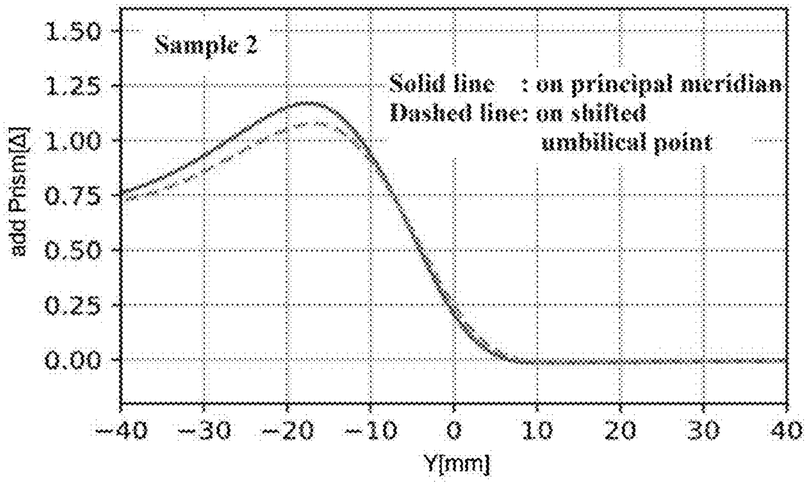
FIGS. 5(*a*)-5(*c*) FIG. 5(*a*) to FIG. 5(*c*) are graphs illustrating addition prism curves for Samples 2 to 4 according to Examples.
Figure 5B:
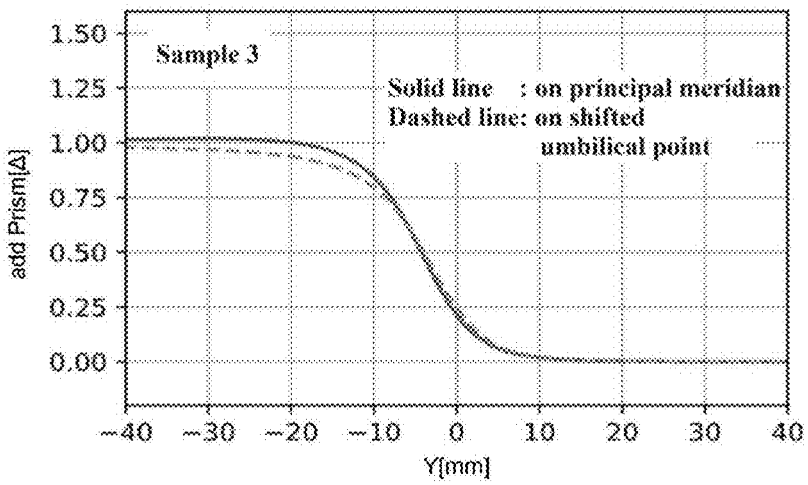
Figure 5C:
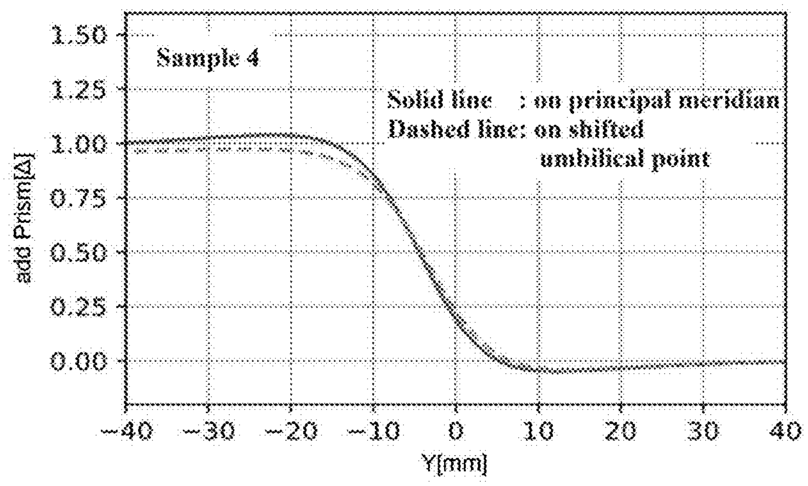
Figure 6A:
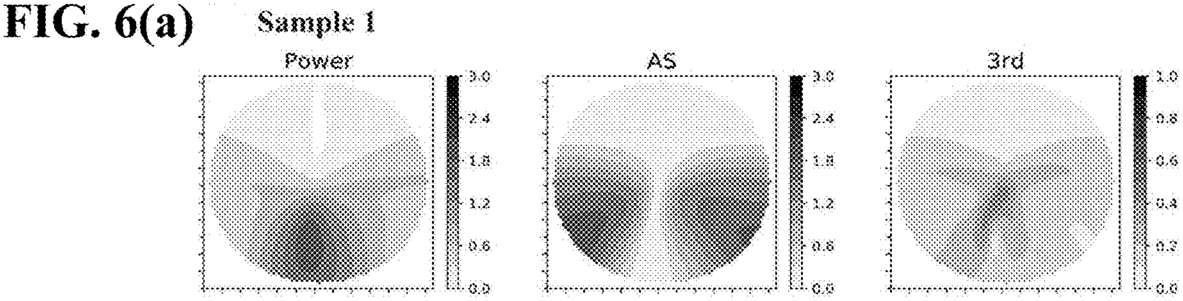
FIGS. 6(*a*)-6(*d*) FIG. 6(*a*) to FIG. 6(*d*) are diagrams illustrating a power distribution, astigmatism distribution, and third-order aberration distribution, for Samples 1 to 4 according to Examples.
Figure 6B:
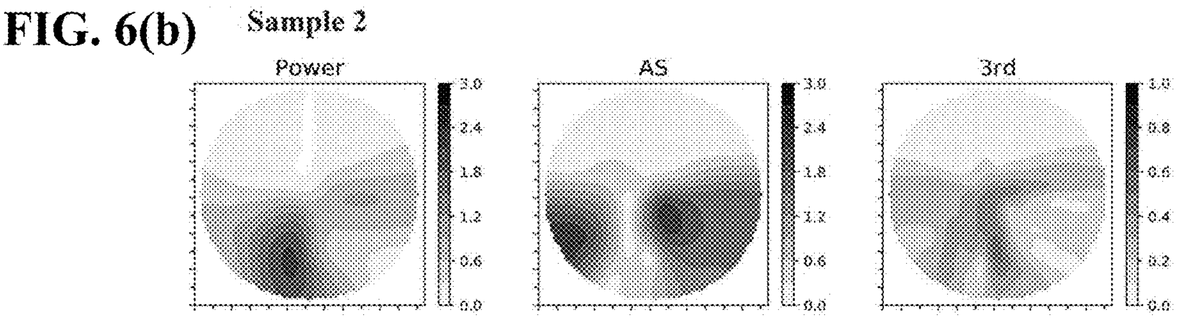
Figure 6C:
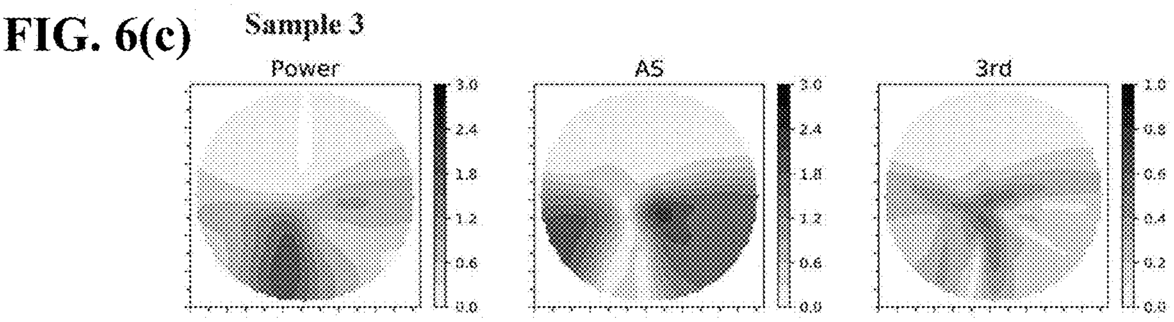
Figure 6D:
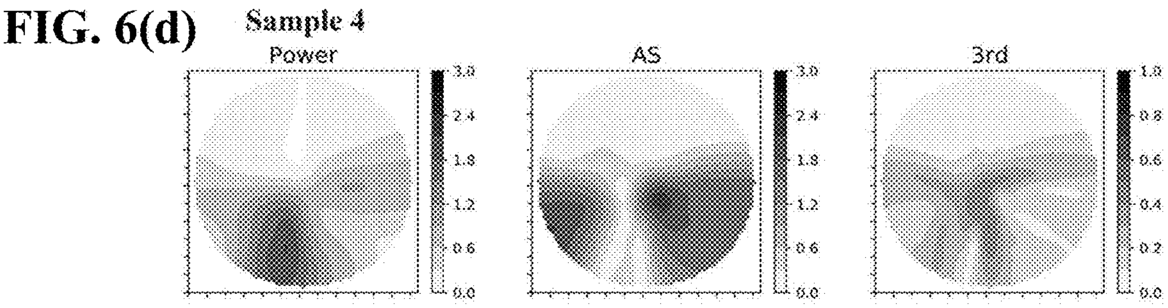

Sample 2 was a progressive power lens to which a base in prism proportional to the viewing distance was added. The addition prism curve of Sample 2 is illustrated in FIG. 5(*a*). In FIG. 5(*a*), the solid line indicates the addition prism curve on the principal meridian, and the dashed line indicates the addition prism curve on the shifted umbilical point. On the principal meridian, the addition prism slope on the progressive zone was −0.086 Δ/mm, the maximum value of the curvature was 0.0112 Δ/mm$^2$, and the lens had no reverse prism slope. On the shifted umbilical point (where the amount of umbilical point shift=6.1 mm), the addition prism slope on the progressive zone was −0.084 Δ/mm, the maximum value of the curvature was 0.0109 Δ/mm$^2$, and the lens had no reverse prism slope.

Sample 3 was a progressive power lens to which a base in prism was added so that the addition prism curve was a monotonically increasing curve. The addition prism curve of Sample 3 is illustrated in FIG. 5(*b*). In FIG. 5(*b*), the solid line indicates the addition prism curve on the principal meridian, and the dashed line indicates the addition prism curve on the shifted umbilical point. On the principal meridian, the addition prism slope on the progressive zone was −0.077 Δ/mm, the maximum value of the curvature was 0.0105 Δ/mm$^2$, and the lens had no reverse prism slope. On the shifted umbilical point (where the amount of umbilical point shift=5.5 mm), the addition prism slope on the progressive zone was −0.072 Δ/mm, the maximum value of the curvature was 0.0100 Δ/mm$^2$, and the lens had no reverse prism slope.

Sample 4 was a progressive power lens to which a base in prism was added so that the lens had a reverse prism slope in the distance side region of the addition prism curve. The addition prism curve of Sample 4 is illustrated in FIG. 5(*c*). In FIG. 5(*c*), the solid line indicates the addition prism curve on the principal meridian, and the dashed line indicates the addition prism curve on the shifted umbilical point. On the principal meridian, the addition prism slope on the progressive zone was −0.077 Δ/mm, the maximum value of the curvature was 0.0088 Δ/mm$^2$, the reverse prism slope was 0.00204/mm, and the minimum value of the base in prism was −0.0514. On the shifted umbilical point (where the amount of umbilical point shift=5.5 mm), the addition prism slope on the progressive zone was −0.072 Δ/mm, the maximum value of the curvature was 0.0082 Δ/mm$^2$, the reverse prism slope was 0.0020 Δ/mm, and the minimum value of the base in prism was −0.0514. That is, Sample 4 was made to satisfy all of Condition A, Condition B, and Condition C described above.

(2) Characterization

For Samples 1 to 4, the power (Power) distribution, astigmatism (AS) distribution, and third-order aberration (3rd) distribution were measured. The results for Sample 1 are illustrated in FIG. 6(*a*), the results for Sample 2 are illustrated in FIG. 6(*b*), the results for Sample 3 are illustrated in FIG. 6(*c*), and the results for Sample 4 are illustrated in FIG. 6(*d*).

As can be seen from FIG. 6(*b*) to FIG. 6(*d*), Sample 4, in which the addition prism curve had a reverse prism slope, had reduced third-order aberrations compared to Samples 2 and 3, in which the addition prism curve had no reverse prism slope.

Figure 7A:
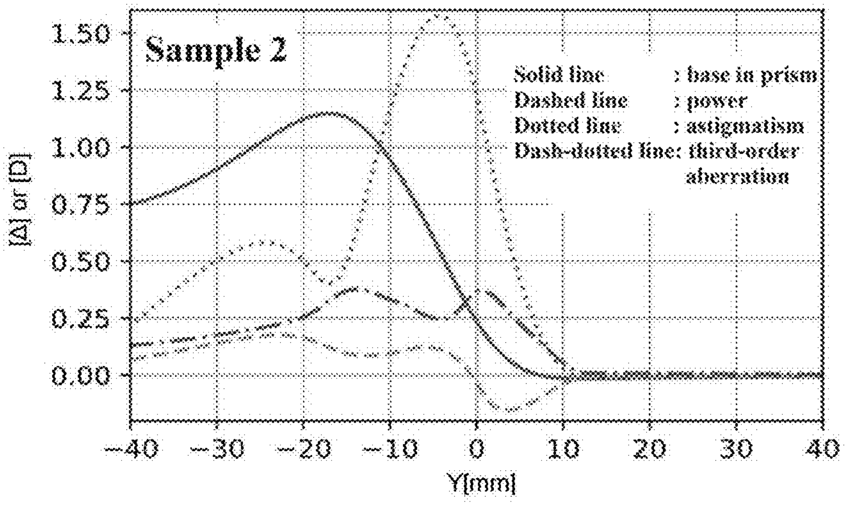
FIGS. 7(*a*)-7(*c*) FIG. 7(*a*) to FIG. 7(*c*) are graphs illustrating the base in prism, power, astigmatism, and third-order aberration, at positions through which the lines of sight pass, for Samples 2 to 4 according to Examples.
Figure 7B:
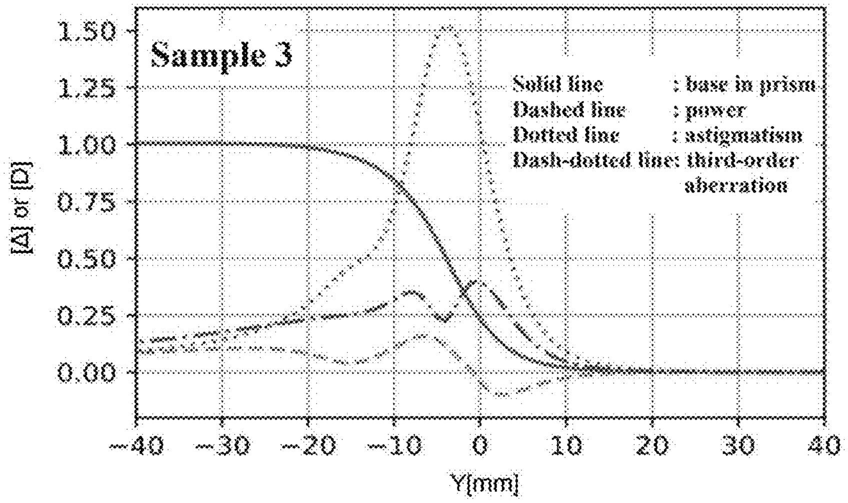
Figure 7C:
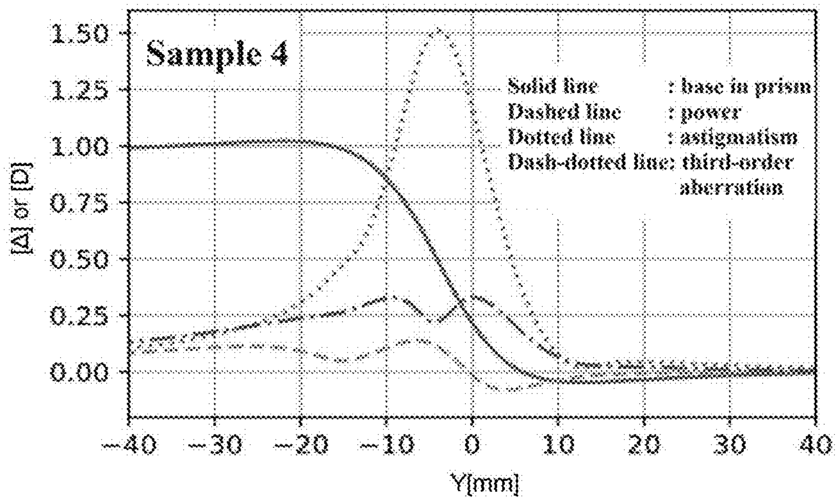

In addition, for Samples 2 to 4, base in prism, power, astigmatism, and third-order aberration were measured at the position through which the line of sight passes (on the midpoint between the principal meridian and the shifted umbilical point) in consideration of the umbilical point. The results for Sample 2 are illustrated in FIG. 7(*a*), the results for Sample 3 are illustrated in FIG. 7(*b*), and the results for Sample 4 are illustrated in FIG. 7(*c*). In FIG. 7(*a*) to FIG. 7(*c*), the values of power, astigmatism, and third-order aberration are indicated in terms of the amount of change (unit: D) with respect to the upper part of the spectacle lens (e.g., Y=40 mm).

As can be seen from FIG. 7(*a*) to FIG. 7(*c*), power decrease occurred in the distance side region of Samples 2 to 4. The amount of power decrease of Sample 2 was −0.34 D, the amount of power decrease of Sample 3 was −0.28 D, and the amount of power decrease of Sample 4 was −0.23 D. That is, Sample 4, in which the addition prism curve had a reverse prism slope, had reduced power decrease compared to Samples 2 and 3, in which the addition prism curve had no reverse prism slope.

Thus, it is confirmed that an appropriate amount of reverse prism slope provided in the distance side region of the addition prism curve reduces third-order aberrations, and also reduces the power decrease in the distance side region due to the shift of position, through which the line of sight passes, toward the nose.

The invention claimed is:

1. A spectacle lens to which a base in prism configured to deflect light toward a nose of a user is added, wherein the spectacle lens has a reverse prism slope that has a sign opposite to a sign of an addition prism slope on a progressive zone at least in a distance side region of the addition prism curve expressed as a function of vertical coordinates on the spectacle lens, and both on a principal meridian of the spectacle lens and on an umbilical point that has been shifted toward the nose of the user by the base in prism, an absolute value of the reverse prism slope is larger than 0.014 times the absolute value of the addition prism slope on the progressive zone.

2. The spectacle lens according to claim 1, wherein the absolute value of the reverse prism slope is less than 0.00625 Δ/mm.

3. The spectacle lens according to claim 2, wherein both on a principal meridian of the spectacle lens and on an umbilical point that has been shifted toward the nose of the user by the base in prism, the absolute value of the reverse prism slope is less than 0.00625 Δ/mm.

4. The spectacle lens according to claim 1, wherein an amount of the base in prism that is added changes depending on a viewing distance.

5. The spectacle lens according to claim 1, wherein a difference between a maximum value and a minimum value of the amount of the base in prism that is added is 0.25Δ or more.

6. A manufacturing method of a spectacle lens to which a base in prism configured to deflect light toward a nose of a user is added, comprising:

a prism design step to design so that the spectacle lens has a reverse prism slope that has a sign opposite to a sign of an addition prism slope on a progressive zone at least in a distance side region of the addition prism curve expressed as a function of vertical coordinates on the spectacle lens, wherein in the prism design step, both on a principal meridian of the spectacle lens and on an umbilical point that has been shifted toward the nose of the user by the base in prism, an absolute value of the reverse prism slope is designed to be larger than 0.014 times the absolute value of the addition prism slope on the progressive zone.

7. The spectacle lens according to claim 2, wherein an amount of the base in prism that is added changes depending on a viewing distance.

8. The spectacle lens according to claim 2, wherein a difference between a maximum value and a minimum value of the amount of the base in prism that is added is 0.25 Δ or more.

9. The spectacle lens according to claim 3, wherein an amount of the base in prism that is added changes depending on a viewing distance.

10. The spectacle lens according to claim 3, wherein a difference between a maximum value and a minimum value of the amount of the base in prism that is added is 0.25 Δ or more.

11. The spectacle lens according to claim 4, wherein a difference between a maximum value and a minimum value of the amount of the base in prism that is added is 0.25 Δ or more.

* * * * *